United States Patent

[11] 3,615,325

[72] Inventor  Robert C. Failing
               Wilmington, N.C.
[21] Appl. No. 829,584
[22] Filed     June 2, 1967
[45] Patented  Oct. 26, 1971
[73] Assignee  General Electric Company

[54] METHOD OF MAKING A SLEEVE-TYPE METAL TO GLASS TO METAL TO METAL SEAL
6 Claims, 3 Drawing Figs.

[52] U.S. Cl. ..................................................... 65/43,
                                             65/59, 29/471.1, 29/473.1
[51] Int. Cl. ............................................. C03c 27/02
[50] Field of Search ........................................ 65/43, 59;
                                             29/471.1, 473.1

[56] References Cited
UNITED STATES PATENTS
3,107,421  10/1963  Turnbull ....................... 29/471.1
3,264,015  8/1966   Mayers ......................... 65/43 X Primary Examiner—Arthur D. Kellogg
Attorneys—Joseph B. Forman, Michael Masnik, Frank L. Neuhauser and Oscar B. Waddell ABSTRACT: A method of making a hermetic metal to glass to metal to metal seal of the sleeve type, wherein the component parts are formed into an integral structure by a simplified method and a one-step heating cycle.

PATENTED OCT 26 1971 3,615,325

INVENTOR.
ROBERT C. FAILING
BY Michael Masnik
HIS ATTORNEY

METHOD OF MAKING A SLEEVE-TYPE METAL TO GLASS TO METAL TO METAL SEAL

BACKGROUND OF THE INVENTION

My invention relates to a method of making hermetic metal to glass to metal seals of the sleeve type wherein the component parts are heat sealed to produce a structure that will not rupture when one of the component parts is subjected to flexing with respect to the other component parts.

Metal to glass seals of various types are extensively used in providing an electrical connection in various apparatus. The seal protects the interior of the apparatus from contamination of outside air. One form of sleeve seal is usually made for a metal header by providing an opening in the header for receiving a glass preform, and a conductive pin which are inserted into the opening in the header and sealed by means of heat. In many applications, the coefficients of thermal expansion of glass and metal are so selected as to insure a compression seal upon cooling. In compression seals, the coefficients of thermal expansion of the glass are considerably less than that of the metal header. The hermetic quality of compression seals is mainly dependent upon the forces produced on the glass and metal members by the differences in contraction due to differences in coefficients of thermal expansion and also the rate of cooling. Where it is desired to sheath or encase the pin in a metal sleeve for reasons to be explained, the manufacturing process needs to be augmented. The known methods of forming such a prior art metal to glass to metal to metal seal involves more than a single heating step. Usually, the first step in the manufacture is to assemble the conductive pin and the metal sleeve. In such instances, the sleeve is usually brazed to the conducive pin by a separate process. After the assembly of the sleeve and conductive pin, the sleeve and pin are then fused to the header by a hermetic sealing process heating in an atmosphere controlled furnace. The use of a sheathed pin permits greater flexing of the pin during assembly and use without rupture of the seal. Applicant has now devised a method of forming sleeve-type seals which eliminates the two step heating process previously required to produce sleeve seals.

SUMMARY OF THE INVENTION

It is therefore an object of my invention to form a metal to glass to metal to metal seal by a simplified method.

It is another object of my invention to provide a metal to glass to metal sleeve seal which will not rupture during use.

Briefly stated, the objects of the invention are attained by assembling the elements of the structure into a single unit prior to any furnace cycle. The elements comprise a header, a glass preform, a sleeve and a metal plated or coated pin. The elements when assembled are united by a single furnace cycle.

Those parts of my invention which are considered to be new are set forth in detail in the claims appended hereto. The invention, however, may be better understood and further objects and advantages thereof appreciated from a consideration of the drawings and detailed description.

DRAWINGS AND DETAILED DESCRIPTION

My invention will be hereinafter described in greater detail with reference to the accompanying drawings in which.

Figures 1, 2:
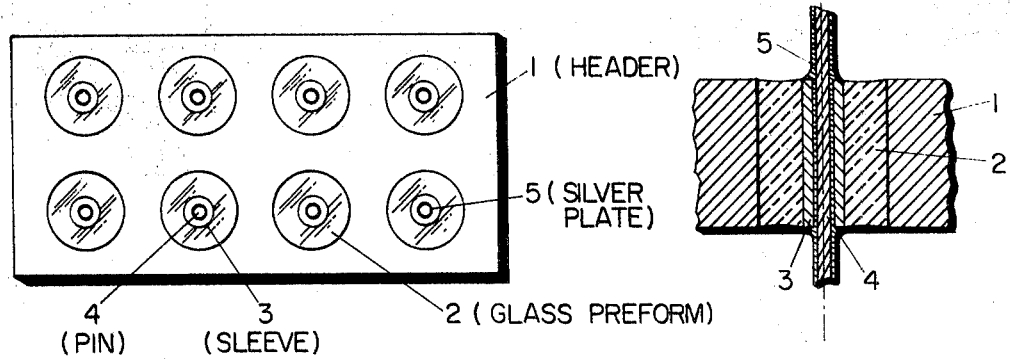
FIG. 1 is an enlarged plan view of an electrical component having a plurality of seals.
FIG. 2 is an enlarged fragmentary cross-sectional view showing the metal to glass to metal sleeve seal.

Referring more particularly to FIGS. 1 and 2 of the drawings, there is shown a header having a plurality of seals, wherein 1 represents a metal header having circular cutout portions for receiving glass 2, a nickel iron alloy tube or sleeve 3 and a pin 4 which is metal coated or plated with silver 5.

The header is composed of AISI-C1017 Aluminum killed cold rolled steel, as reported in the *Metals Handbook*, ASM, eighth Edition, at page 62 under "Compositions of Standard Steels." The header steel has a coefficient of thermal expansion of $135 \times 10^{17}/°C.$ at 25° to 300° C.

The glass 2, which completely fills the space between the metal header and the metal sleeve, or tube 3, must have a coefficient of thermal expansion sufficiently less than the metal header to form a compression, hermetic seal. One of the glasses suitable for forming the glass to metal seal is a lead-free, soda-lime compression sealing glass having a coefficient of thermal expansion of $89 \times 10^{17}/°C.$ at 25° to 300 C., and which will provide required hermeticity when heated to a temperature of about 930° C.

The sleeve is composed of a nickel-iron alloy, which contains 51 percent nickel and has a coefficient of thermal expansion of $97 \times 10^{17}/°C.$ at 25° to 300° C. and melting point of 1425° C.

The pin is composed of an alloy which contains 42 percent nickel, 5.75 percent chromium and the balance iron. The alloy has a coefficient of thermal expansion of $97 \times 10^{17}/°C.$ at 25° to 300° C. and a melting point of 1425° C.

Other metals may be used for the sleeve, pin and header, as well as other glass may be used for the glass seal. These materials, however, should have substantially the same melting and expansion properties to achieve desired brazing and sealing.

Figure 3:
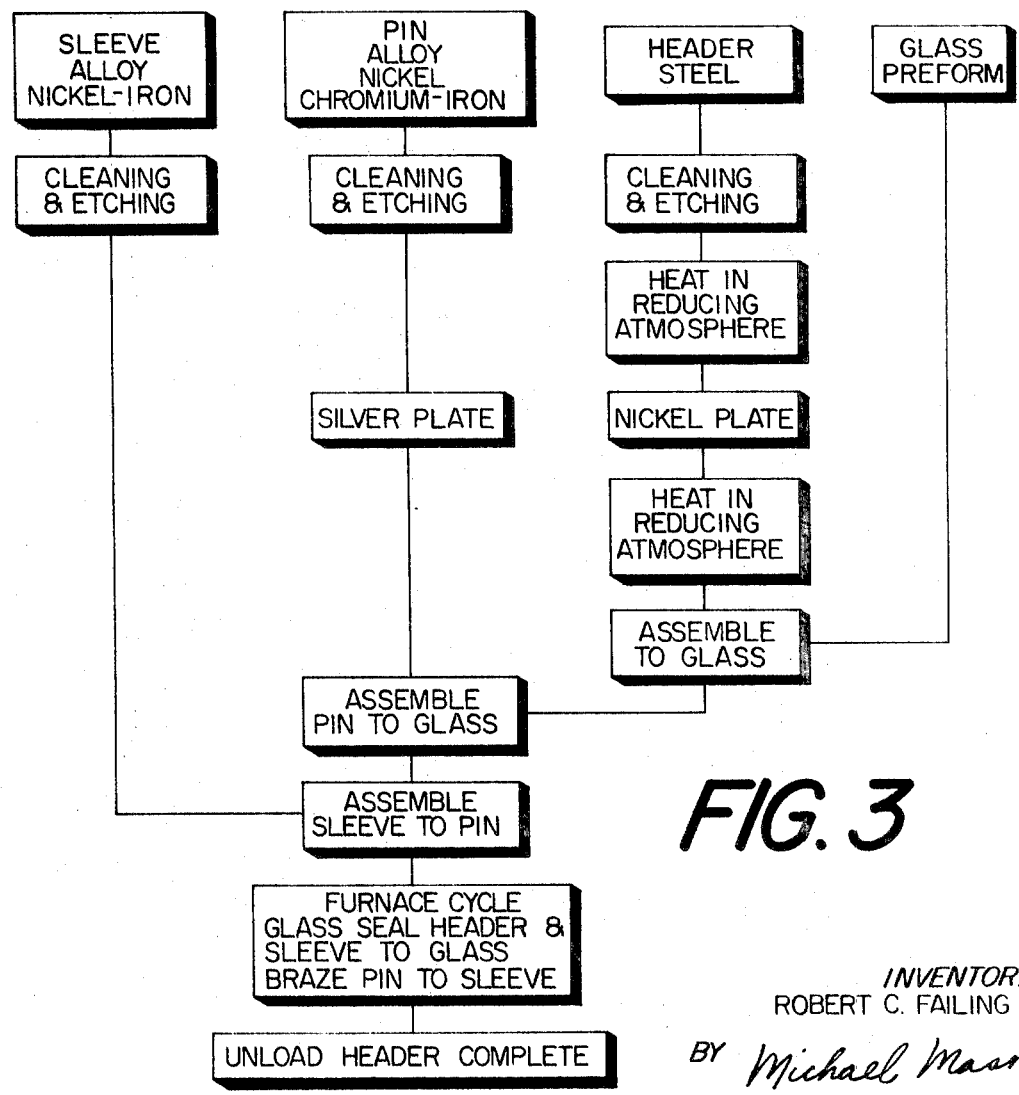
FIG. 3 is a flow block diagram outlining the steps of manufacturing the sleeve seal according to one embodiment of the invention.

Referring to FIG. 3 of the drawings, there is shown the sequential steps and procedures used in treating the parts of the sleeve structure prior to final assembly and furnace firing. As can be readily seen from the flowsheet, the sleeve, pin and header blank are cleaned-etched in an acid bath and headers are treated in a reducing atmosphere. Following the cleaned-etched step, the pins are coated or plated along a predetermined portion of their length with a metal such as silver. The metal selected for the pin coating should have substantially the same melting point as the glass to prevent the glass or metal from bubbling or vaporizing. The amount of metal used for the pin coating is selected to insure that metal is drawn from the unsheathed portion of the pin by capillary action. Thus, the flow between the pin and sleeve provides a brazed connection. It should be further noted that the pin, when it is assembled in the sleeve, is of greater length than the sleeve in order that most of the flexing of the pin occurs above the glass and sleeve level.

As aforementioned, the header is cleaned-etched and subject to a reduced atmosphere, after which it may be nickel plated to a predetermined thickness to inhibit corrosion. After the nickel plating the header may be outgassed by heating it in a reducing atmosphere. However, this additional step is optional.

Following the cleaning of the sleeve and pin, the cleaned-etched and reducing gas treatment of the header, and the silver plating of the pin and the nickel plating of the header, the sleeve, pin, header and glass preform are assembled on suitable fixtures and fired in a furnace at a temperature of about 930° C., preferably in a reducing atmosphere. After the furnace treatment, the glass to metal seal assembly is washed to remove any carbon.

As many widely different embodiments of this invention may be made without departing from the spirit and scope thereof, it is to be understood that this invention is not limited to the specific embodiments, except as defined in the appended claims. Thus for example, while the embodiment disclosed involved a compression hermetic seal, the coefficients of expansion of the materials could be selected to provide other types of seals, such as, for example, matched seals.

What is claimed as new and desired to be secured by Letters Patent of the United States is:

1. The method of fabricating a metal to glass to metal to metal seal assembly including a metal header, a glass preform, a metal sleeve and a metal coated pin which comprises;

a. coating the pin with a conductive braisable metal;
assembling the coated pin into a sleeve, into a glass preform, into a header;

c. heating the assembly to a temperature where the glass and metal coating on the pin concurrently melt to form a header metal to glass to sleeve metal compression seal and a pin to sleeve brazed seal.

2. The method of claim 1 wherein the pin is coated with a metal having a predetermined thickness so that the metal drawn from the portion of the pin unsheathed by the sleeve by capillary action flows between the pin and sleeve to provide a brazed connection.

3. The method of claim 1 wherein the melting point of the glass and the metal coating for the pin is substantially the same.

4. The method of claim 1 wherein the coefficient of thermal expansion of the glass is sufficiently less than that of the metal header to form a compression, hermetic seal.

5. The method of claim 1 wherein the pin length is greater than the sleeve length to permit pin flexure above the glass level and the top of the sleeve without seal damage.

6. The method of claim 1 wherein the glass preform and the pin plating have substantially the same melting temperature and the seal assembly is heated in a controlled atmosphere to insure desired sealing and brazing.

UNITED STATES PATENT OFFICE
CERTIFICATE OF CORRECTION

Patent No. 3,615,325　　　　　　　　Dated October 26, 1971

Inventor(s) Robert C. Failing

It is certified that error appears in the above-identified patent and that said Letters Patent are hereby corrected as shown below:

Column 1, line 14, cancel "for" and insert -- from --

Column 1, line 28 cancel "THe" and insert -- The --

Column 2, line 3, cancel "x $10^{17}$/°C" and insert -- x $10^{-7}$/°C --

Column 2, line 10, cancel "x $10^{17}$/°C" and insert -- x $10^{-7}$/°C --

Column 2, line 15, cancel "x $10^{17}$/°C" and insert -- x $10^{-7}$/°C --

Column 2, line 19, cancel "x $10^{17}$/°C" and insert -- x $10^{-7}$/°C --

Column 2, line 72, cancel "assembling" and insert -- b) assembling --.

Signed and sealed this 6th day of February 1973.

(SEAL)
Attest:

EDWARD M. FLETCHER, JR.　　　　　　ROBERT GOTTSCHALK
Attesting Officer　　　　　　　　　　Commissioner of Patents